(No Model.)
W. H. KNIGHT.
SAFETY CATCH FOR ELECTRICAL TRANSLATING DEVICES.
No. 338,084. Patented Mar. 16, 1886.
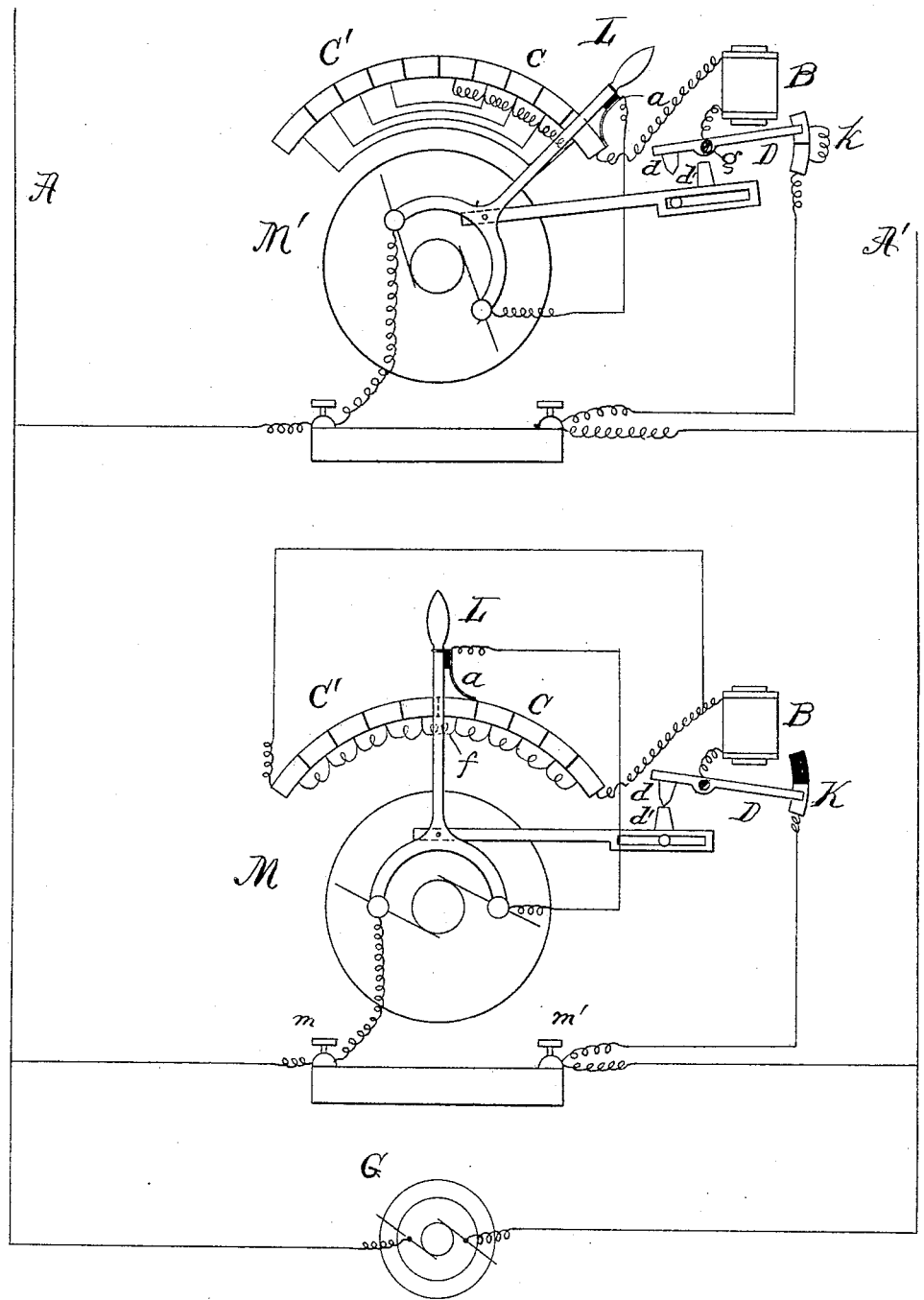
Witnesses
Albert E. Lynch
Wm. M. Monroe.
Inventor
Walter H. Knight
by Bentley & Knight
attys.

UNITED STATES PATENT OFFICE.

WALTER H. KNIGHT, OF NEW YORK, N. Y.

SAFETY-CATCH FOR ELECTRICAL TRANSLATING DEVICES.

SPECIFICATION forming part of Letters Patent No. 338,084, dated March 16, 1886.

Application filed July 10, 1885. Serial No. 171,190. (No model.)

*To all whom it may concern:*

Be it known that I, WALTER H. KNIGHT, a citizen of the United States, and a resident of New York city, New York, have invented certain new and useful Improvements in Safety-Catches for Electrical Translating Devices, of which the following is a specification, reference being made to the accompanying drawing.

My invention consists in a cut-out or circuit-controller placed in circuit with the translating device to be protected, and adapted to respond to abnormal increments of current, and made dependent for restoration to its original condition after it has been actuated, upon a second device which is operated at will and which restores the circuit to a condition wherein the abnormal current which actuates the cut-out is impossible. It is especially adapted for use in cases where a number of electric motors are operated in multiple arc from the same circuit. It is well-known that the current on an electric circuit will distribute itself over several branch circuits in an inverse proportion to the resistances of those branches. When, therefore, branch currents are led from a common source through two or more electric motors the variation of current in the several branches will be very great on account of the great variation in resistance due to the variable counter electro-motive force of the motors running at variable speeds. If the increase in current in any one branch becomes too great, the motor in that branch is liable to be ruined or injured. When electric motors are thus operated in multiple arc with variable loads and at variable speeds, it is customary to provide a resistance under control of the operator by means of which he compensates for inequalities in the working of the motor. To prevent all accidents, however, I deem it necessary to include a safety-catch of the type described in the circuit of each motor.

In the accompanying drawing, M and M' represent two electric motors in multiple arc, branches from the mains A and A', G being the generator.

L is the commutator-lever, under control of the operator, for shifting the position of the brushes to control the motion and direction of rotation of the motor. Upon this lever is an insulated spring, *a*, which slides over a set of contact-plates, C, as the lever is moved in one direction, and over a similar set, C', as it is moved in the other direction. These plates are connected to successive points in a series of resistances, and the two sets are connected by a coil, *f*, of very great resistance, while the two terminal plates are connected to the main line, and the spring *a* is connected to the motor, so that as the lever is moved away from the vertical position in either direction resistance is cut out of the circuit through the motor.

In each motor-circuit is included an electro-magnet, B, adapted to respond only to an abnormal current. Its armature D is connected to one terminal of the magnet-coil at its pivot, and at one end it rests upon contact-plate K, connected to main A' through binding-post *m'*, and it is so retarded by friction on its pivot *g*, which may be in the form of a set-screw, as to be moved only by a predetermined current in B, and when once drawn up by the magnet it will remain in that position until forcibly restored to its normal position. Upon the opposite end of D is a beveled lug, *d*, and a corresponding lug, *d'*, is formed on the upper edge of a connecting-bar, R, which is jointed to lever L and has a reciprocating motion as the lever moves back and forth. When L is in its vertical position with the maximum resistance in circuit and the brushes at their neutral point, lug *d'* is directly under *d*, holding D in its normal position. Should D be in other that its normal position when L is approaching its vertical position from either direction, the beveled surfaces of *d* and *d'* will engage and D be thrown down, as shown with motor M', into its normal position.

The circuit in motor M may be traced from main A' to post *m'*, to plate K, to lever D, to magnet B, to the resistance, to spring *a*, to the motor, to post *m*, and to main A. This is the normal condition of the apparatus, and the motor can now be operated under control of lever L in either direction, the resistance being cut out as the motor increases its speed and its counter electro-motive force in consequence of the altered position of the brushes. Should the operator, however, throw his lever too suddenly in starting the motor under a heavy load, the resistance will be thrown out of circuit before the motor can overcome the inertia of the load and attain its normal speed. An abnormal current would then pass through the motor and tend to injure it, but for the safety-catch B, which would then come into action, as is illustrated in motor M'. The magnet, responding to the abnormal increment of current, would attract its armature D, drawing it from contact-plate K onto plate K' of insulating material, and thereby breaking the main circuit.

Any well-known device for lessening the spark on the interruption of the circuit may be used or a great resistance, as $k$, be left in the circuit. When this occurs, the motor will be stopped and the circuit only restored to its normal condition when the operator has drawn back his lever, inserting resistance C and then forcing D into its original position by the meeting of lugs $d$ and $d'$. When this has been done, the circuit will be in its original condition and the operator will be at liberty to go ahead more cautiously.

I do not claim the arrangement of resistances shown with motor M with the commutator-lever passing over the contacts, but an improvement thereon of my invention is shown with M'.

Instead of duplicating all the coils of C' at C, I simply duplicate the contact-plates and connect each one with its corresponding plate in the series C', so that the same coils may be used for either the positive or negative movement of the lever L.

I claim—

1. The combination of an electric circuit, a translating device in said circuit, and a cut-out or circuit-controller responding to abnormal increase of current in the said circuit, with apparatus for reducing the strength of current connected to the said cut-out or circuit-controller, so that the latter cannot be restored until the said apparatus has reduced the current to the normal strength.

2. The combination, with an electric circuit, of a translating device therein, means for controlling at will the current on said circuit, and a cut-out or circuit-controller responding to an abnormal increase of current and dependent upon said means, whereby the cut-out or circuit-controller cannot be restored to its original position until the current-controller has been actuated.

3. The combination, with an electric circuit, of a translating device therein, a cut-out or circuit-controller responding to an abnormal increase of current, a resistance in the circuit, with means for controlling it, and actuating devices for the said cut-out or controller connected to the said means, whereby the cut-out or controller is restored to its original position when said resistance has been cut in.

4. The combination of an electric circuit, including an electric translating device, a resistance therein variable at will by mechanism under control of the operator, and a cut-out or circuit-controller responding to an abnormal current, with a restoring device connected to the resistance-controlling mechanism and adapted to restore said cut-out to its normal position when said mechanism is at a definite position.

In testimony whereof I sign this specification, in the presence of two witnesses, this 30th day of June, 1885.

WALTER H. KNIGHT.

Witnesses:
G. RENAULT,
HERBERT KNIGHT.